(12) United States Patent  
Conley

(10) Patent No.: US 7,843,497 B2  
(45) Date of Patent: Nov. 30, 2010

(54) ARRAY-CAMERA MOTION PICTURE DEVICE, AND METHODS TO PRODUCE NEW VISUAL AND AURAL EFFECTS

(76) Inventor: Gregory J. Conley, 7955 Bellevue Rd., Grosse Ile, MI (US) 48138

(*) Notice: Subject to any disclaimer, the term of this patent is extended or adjusted under 35 U.S.C. 154(b) by 1335 days.

(21) Appl. No.: 09/727,034

(22) Filed: Nov. 30, 2000

(65) Prior Publication Data

US 2001/0028399 A1 Oct. 11, 2001

Related U.S. Application Data

(63) Continuation of application No. 08/598,158, filed on Feb. 7, 1996, now abandoned, which is a continuation of application No. 08/251,398, filed on May 31, 1994, now abandoned.

(51) Int. Cl.
*H04N 5/262* (2006.01)
*H04N 7/18* (2006.01)

(52) U.S. Cl. ................................. 348/239; 348/159

(58) Field of Classification Search .............. 348/42, 348/47, 48, 157, 159, 239; 396/322, 333; 352/60, 93, 121, 133, 53, 57
See application file for complete search history.

(56) References Cited

U.S. PATENT DOCUMENTS

| | | | |
|---|---|---|---|
| 2,298,476 A | 10/1942 | Goldsmith | |
| 3,178,720 A | 4/1965 | Collender | 352/38 |
| 3,682,064 A | 8/1972 | Matsunaga et al. | 95/18 P |
| 3,815,979 A | 6/1974 | Collender | 352/38 |
| 4,089,597 A * | 5/1978 | Collender | 352/53 |
| 4,321,625 A | 3/1982 | Smith | 358/210 |
| 4,453,182 A * | 6/1984 | Wilkinson et al. | 348/159 |
| 4,589,140 A | 5/1986 | Bishop et al. | 382/8 |
| 4,698,682 A * | 10/1987 | Astle | 348/586 |
| 4,730,106 A | 3/1988 | Nilson et al. | 250/213 VT |
| 4,956,705 A | 9/1990 | Wright | 358/88 |
| 5,022,727 A * | 6/1991 | Smith et al. | 359/23 |

(Continued)

FOREIGN PATENT DOCUMENTS

EP 1296179 B1 10/2004

(Continued)

OTHER PUBLICATIONS

"The Wizard of the Toric Camera" (English language translation); OMNI Scientific Entertainment Magazine; pp. 116-118; Apr. 1986; Japan.

(Continued)

*Primary Examiner*—Luong T Nguyen  
(74) *Attorney, Agent, or Firm*—Harness, Dickey & Pierce, P.L.C.

(57) ABSTRACT

A system and method for creating special effects comprising capturing an image of an object or objects in motion from each of a plurality of cameras aligned in an array, assembling the images from each camera into a series of images in a manner providing a simulation of motion from a perspective along the array with respect to the object or objects within the images when a series of images is displayed in sequence, wherein certain object or objects appear substantially stationary in time during the simulation of motion.

9 Claims, 11 Drawing Sheets

U.S. PATENT DOCUMENTS

| | | | | |
|---|---|---|---|---|
| 5,027,413 | A | | 6/1991 | Barnard ......................... 382/1 |
| 5,099,846 | A | | 3/1992 | Hardy ...................... 128/653.1 |
| 5,101,268 | A | | 3/1992 | Ohba .......................... 358/88 |
| 5,129,014 | A | | 7/1992 | Bloomberg .................. 382/48 |
| 5,184,732 | A | | 2/1993 | Ditchburn et al. ........... 209/576 |
| 5,237,353 | A | * | 8/1993 | Montes ....................... 352/53 |
| 5,260,814 | A | | 11/1993 | Smith et al. ................... 359/23 |
| 5,380,978 | A | | 1/1995 | Pryor .................... 219/121.64 |
| 5,413,345 | A | | 5/1995 | Nauck .................... 273/185 R |
| 5,448,291 | A | | 9/1995 | Wickline .................... 348/159 |
| 5,455,689 | A | | 10/1995 | Taylor et al. ................ 358/450 |
| 5,495,576 | A | | 2/1996 | Ritchey ...................... 395/125 |
| 5,497,188 | A | | 3/1996 | Kaye |
| 5,521,634 | A | | 5/1996 | McGary ..................... 348/169 |
| 5,613,048 | A | * | 3/1997 | Chen et al. .................. 345/419 |
| 5,657,077 | A | * | 8/1997 | DeAngelis et al. ........... 348/157 |
| 5,659,323 | A | | 8/1997 | Taylor ........................ 348/159 |
| 5,745,126 | A | | 4/1998 | Jain et al. .................... 345/952 |
| 5,745,305 | A | | 4/1998 | Nalwa ........................ 359/725 |
| 6,154,251 | A | | 11/2000 | Taylor ........................ 348/159 |
| 6,331,871 | B1 | | 12/2001 | Taylor |
| 6,933,966 | B2 | | 8/2005 | Taylor |

FOREIGN PATENT DOCUMENTS

WO       WO 96/19892      6/1996

OTHER PUBLICATIONS

"Early Time-Slice Cameras" Tim Macmillan; http://www.timeslicefilms.com/cameras.shtml; circa 2007; United Kingdom.

"Tim Macmillan Curriculum Vitae" Tim Macmillan, http://www.timeslicefilms.com/cv.shtml; circa 2007; United Kingdom.

"BBC Tomorrow's World" television program; Author Unknown; Macmillan Time-Slice camera segment; DVD; May 12, 1993; United Kingdom.

"The Boy in the Bubble" music video; Jim Blashfield and Associates; "Graceland" album; spinning baby element; DVD; circa 1986; Warner Brothers; USA.

"Life Library of Photography: The Camera" Time Life Books; p. 158, 1970; New York.

"Eadward Muybridge," The Encyclopedia of Photography (1986) Online.

Lindsay, David, "The Patent Files: Muybridge Squared," New York Press Weekly, V10, N37, Sep. 10-16, 1997, p. 35.

Magid, Ron, "Techno Babel," American Cinematographer, Hollywood, California, Apr. 1999, pp. 46-55.

Taylor, Dayton, "Virtual Camera Movement: The Way of the Future?" American Cinematographer, Hollywood, California, Sep. 1996, pp. 93-100.

Vagnoni, Anthony. "'Frozen Moment' is Hot Idea," Advertising Age, Oct. 26, 1998, p. 24.

Walker, James Faure, "Silent Motion," 2001.

* cited by examiner

DIVER

ROC TARGET

LAST BEAM SPLITTER
SEES DIMMER VIEW OF
BUTTERFLY

FIG. 5

| | |
|---|---|
| 10 | Get hue and intensity values of target surface reflectance characteristics from operator |
| 20 | Get ideal image shape, size, and location in final display image from operator |
| 30 | For camera x to n, Grab and store image from camera x. |
| 40 | Load image x into memory location. Look for pixel hue and/or intensity values which are close to those in 10 to find actual x target image |
| 50 | Compare ideal target shape, size and location with actual x image shape, size and location. Make record of changes in target image from x as aimed to bring actual into coincidence with ideal. |
| 60 | Increment x and repeat lines 20 to 60 until x equals n. |

(ROC (Record of Changes) file has been created to adjust recorded or dis played images.)

FIG. 6

| | |
|---|---|
| 10 | Get hue and intensity values of target surface reflectance characteristics from operator |
| 20 | Get ideal image shape, size, and location in final display image from operator |
| 30 | For camera x to n, Grab and store image from camera x. |
| 40 | Load image x into memory location. Look for pixel hue and/or intensity values which are close to those in 10 to find actual x target image. |
| 50 | Compare ideal target shape, size and location with actual x image shape, size and location. Make record of changes in camera aim, orientation, focus, focal length, to bring actual into coincidence with ideal. |
| 60 | Increment x and repeat lines 20 to 60 until x equals n. |

(ROC (Record of Changes) file has been created to adjust cameras. Cameras would be adjusted under computer control, according to this ROC file by remote mechanical or electromechanical means. This procedure would be repeated if necessary to update ROC file between adjustments, to fine tune camera array.)

FIG. 7

| | |
|---|---|
| 10 | For cameras x to n, grab and record images of subject illuminated by different colored light points. Load camera image x and x+1 into raster display memories |
| 20 | Identify location in raster display memories where same-color light points reside. Record these locations as morph point pairs between camera x and camera x+1 images. |
| 30 | For cameras x to n, grab and record images of subject illuminated by white light. Load camera images x and x+1 into raster display memories. |
| 40 | Match subject image x with morph point data x. Match subject image x + 1 with morph point data x + 1. |
| 50 | Move screen location and hue and brightness values of morph point pixels in image 1 so that they transform incrementally on screen, according to well known interpolation, to produce the desired effect. |
| 60 | Repeat for sequential pairs of cameras. |

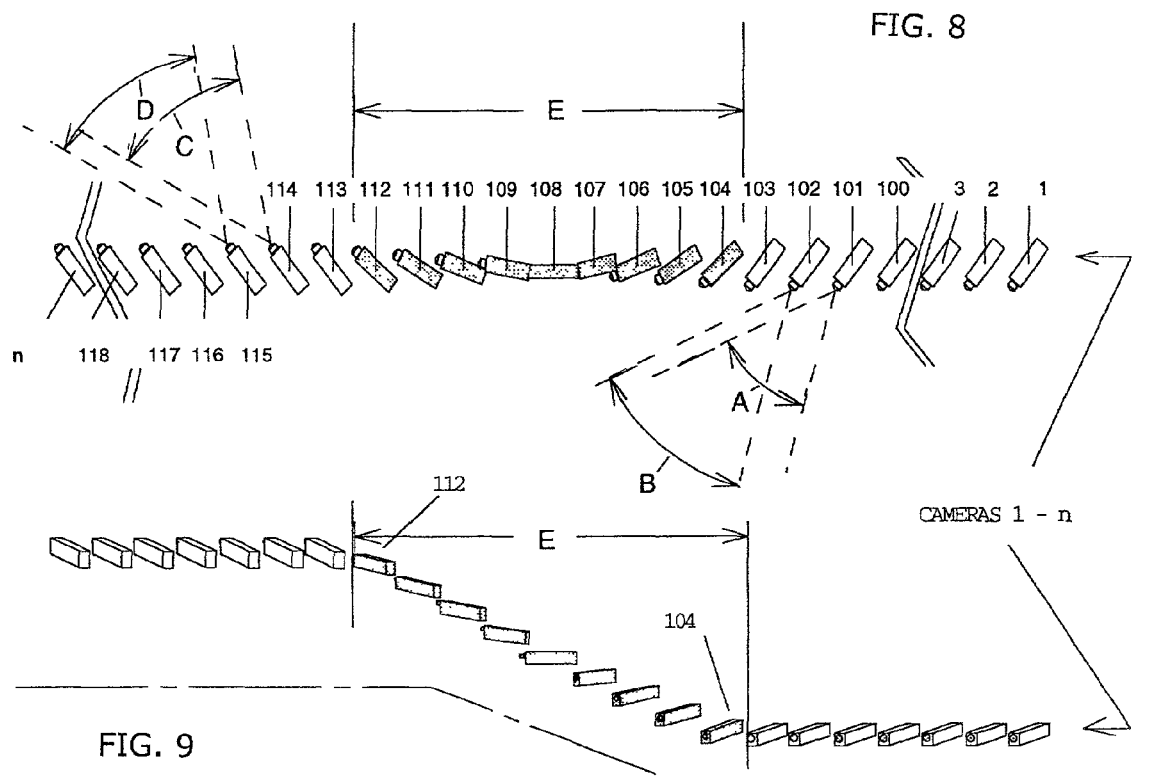

ARRAY-CAMERA MOTION PICTURE DEVICE, AND METHODS TO PRODUCE NEW VISUAL AND AURAL EFFECTS

This application claims the benefit of and is a Continuation Application of U.S. application Ser. No. 08/598,158, filed Feb. 7, 1996 now abandoned, which is a file wrapper continuation of U.S. application Ser. No. 08/251,398, filed May 31, 1994 now abandoned, the disclosures of which are incorporated herein by reference.

FIELD OF INVENTION

This invention relates to the production of new kinds of visual and aural effects for display in motion picture, video and audio venues.

BACKGROUND

Traditionally, a stream of images, recorded by a single motion picture camera, or video camera, is displayed upon a screen to produce an illusion of motion. If a rotational effect of a subject were desired, one would circumnavigate the subject with a motion picture camera and display this series to simulate the rotational effect. But, how would one freeze a subject in one position, say a diver, entering the pool, with water-splashing up all around, and create a rotational motion picture effect about the frozen diver? To freeze the diver in one instant, traditionally one would need to circumnavigate the diver in almost no time (approximately $\frac{1}{2000}$ second or less), with a super-high frame rate motion picture camera. I believe that no such circumnavigational camera device exists. If one wants to freeze, then visually rotate an even faster subject, such as an artillery shell leaving the muzzle of a large military gun, one would need to circumnavigate the speeding shell in $\frac{1}{500,000}$ second or less. What if one wanted to walk into a room full of fluttering butterflies, have the butterflies appear to freeze in their current positions, and be able to cinematically record and display a motion picture simulated "walk" through this room of frozen butterflies? You can do these things, and more, using arrays of cameras, pre-positioned around, or through a subject area. Then sequentially displaying the records made by the many members of these arrays.

Several inventors (see examples below) have suggested methods employing arcuate or circular arrays of camera devices to capture different horizontally displaced photographic records of a subject with the object of facilitating the production, or reproduction of works of sculpture or of providing 3D still or motion picture representations of the subject. None has suggested, or, in my judgment, anticipated the methods and mechanisms to produce the useful and novel frozen effects described above and other kinds of effects described below in my specification.

Examples:

| Smith | U.S. patent 891,013 | June 16, 1908 |
| Ives, | U.S. patent 1,883,290 | Oct. 8, 1932 |
| Ives, | U.S. patent 2,012,995 | Sept. 3, 1935 |
| Staehlin et al | U.S. patent 2,609,738 | Sept. 9, 1952 |
| Strauss | U.S. patent 2,928,311 | March 15, 1960 |
| Collender, | U.S. patent 3,178,720 | April 13, 1965 |
| Glenn, | U.S. patent 3,518,929 | July 7, 1970 |
| Matsunaga, | U.S. patent 3,682,064 | August 8, 1972 |
| Collender, | U.S. patent 3,815,979 | June 11, 1974 |

-continued

| Examples: | | |
|---|---|---|
| Danko, Jr. et al | U.S. patent 4,010,481 | March 1, 1977 |
| Collender, | U.S. patent 4,089,597 | May 16, 1978 |
| Collender, | U.S. patent 4,158,487; | June 19, 1979 |
| Ross, | U.S. patent 4,199,253 | April 22, 1980 |
| Morioka | U.S. patent 4,239,359 | Dec. 16, 1980 |

It is one of the objects of my invention to provide a mechanism and method to capture and display a motion picture-like rotational effect of an animate subject, like looking at a revolving statue of the subject. This subject can be rotated upon any existing and ordinary motion picture screen, or television screen to simulate the visual effect of walking around, and visually inspecting a statue of the subject.

Another object of my invention is to use novel shapes and dispositions of camera arrays in combination with new methods of assembling and presenting these records to produce other novel effects. Camera array shapes, such as, but not limited to long chains of cameras, in linear, or curvilinear arrays are employed. These arrays can be operated in synchrony or non-synchrony to capture different angular visual records of a subject area. These different records can be sequentially displayed to create the novel visual effect of traveling linearly, or curvilinearly along the chain, through a frozen moment of time. The effects will be similar to the tableaux effects in theatrical plays. Animate objects like people are frozen in time, yet one character gets to move through this moment.

A more generalized object of my invention is to provide powerful, new visual and/or aural perceptions of the world, employing methods in which arrays of various receiver devices, such as, but not limited to, camera devices, or microphones, or combinations thereof, capture different angular records of energy emanating from a subject of interest. Which arrays are of many and variable shape, e.g. circular, arcurate, linear, curvilinear, dome-like, or many other shapes. Which arrays are comprised of members that can be individually manipulated, positioned, aimed, and operated, before and during energy capture, by hand, or by remote control, or remote computer control, in synchrony or non-synchrony. Recordings made by the many array members are captured, manipulated, and combined into many and variable sequences, and presented according to methods described below to provide said novel visual and/or aural perceptions.

FIGURES

FIG. 1A shows 10 video camera devices, arrayed in a horizontally circular array around a diving area. In practice, from 6 to hundreds of cameras would be employed in this array. Long focal length lenses would enable distant camera placement, allowing a large number of array members. 150 computer; 152 video storage (tape, disc, or other); 153 alternative on-camera storage (as in High Eight); 156 pan/tilt servos; 158 and 160 are electrical or fiber optic communication paths between components, operator, and audience.

Figure 2:
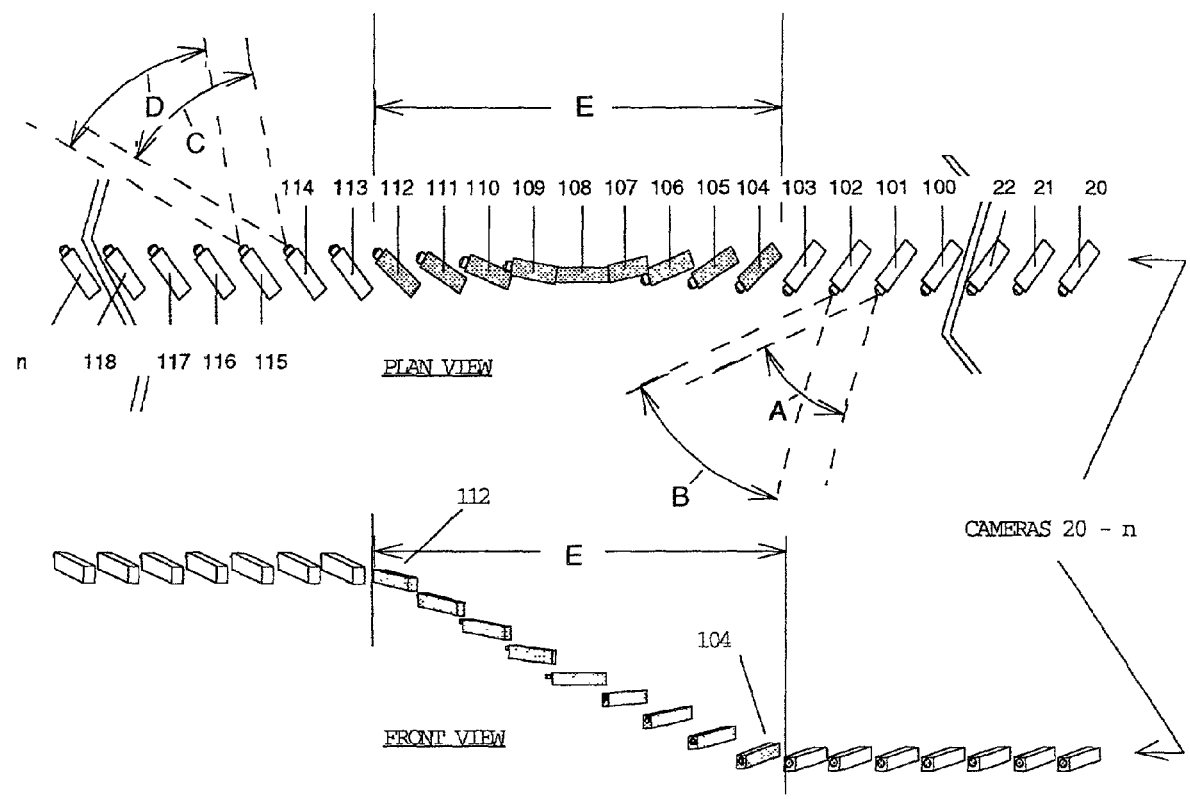

FIG. 2 shows a curvilinear array of camera devices, 20-*n*, in Plan and Front views. Cameras 20-103 take in a leftward view. Cameras 113-*n* take in a rightward view. Cameras 104-112 (series E) change view from leftward to rightward. Cameras 104-112 (series E) rise sequentially above the field of view of preceding cameras. 'A' is the view seen by camera 101. 'B' is the view seen by camera 102. 'C' is the view seen by camera 114. 'D' is the view seen by camera 115.

Figure 3A:
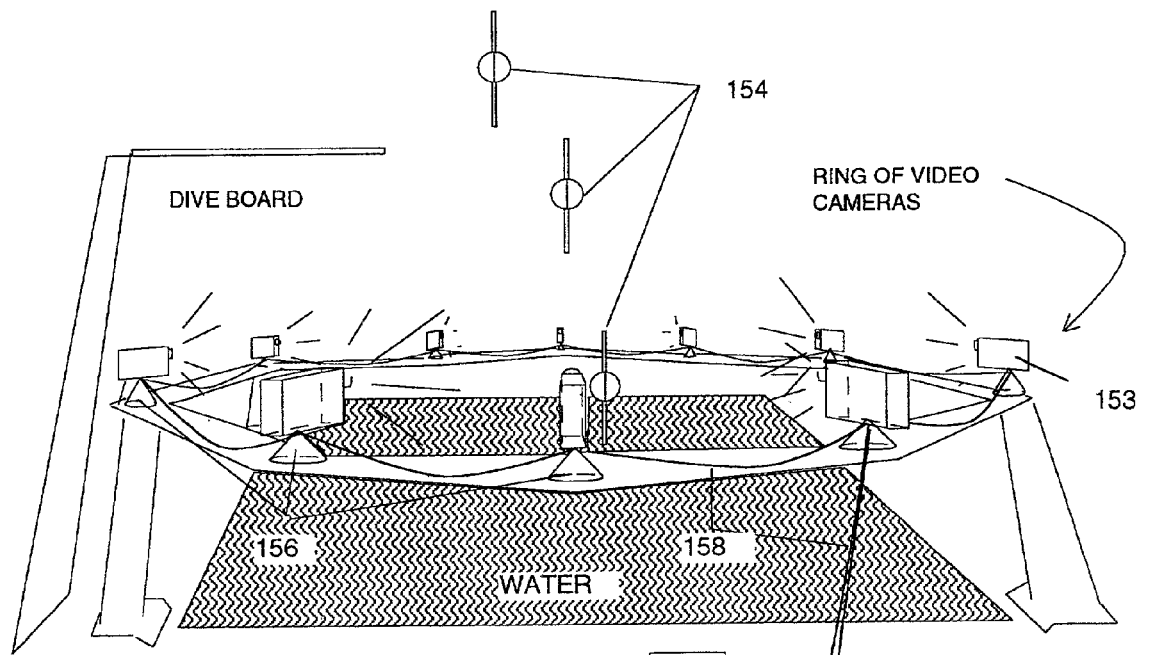

FIG. 3A shows rod-shaped ROC targets (154), imaged by array members. 162 is an axis of rotation. (See FIG. 2 above for description of other numbered items.)

Figure 3B:
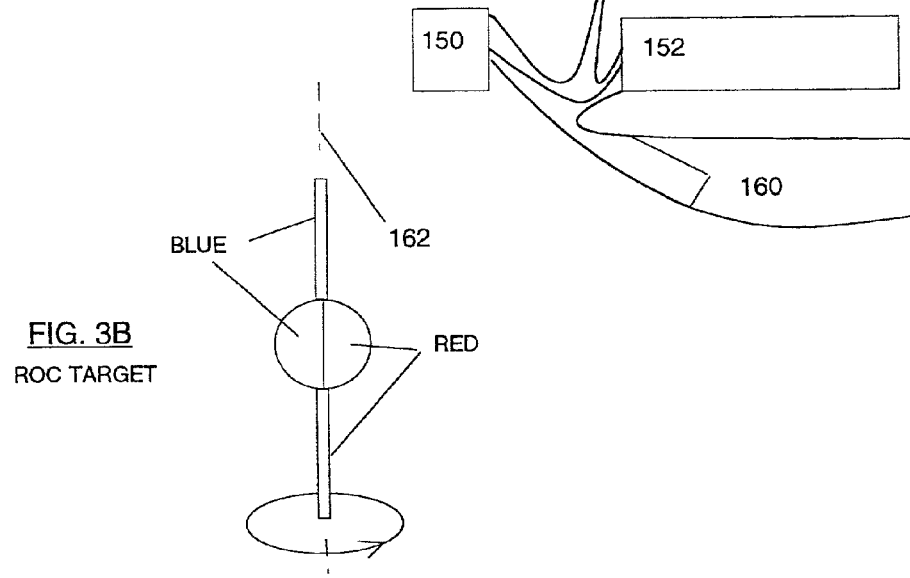

FIG. 3B shows enlarged ROC target. 162 is axis of rotation.

Figure 4:
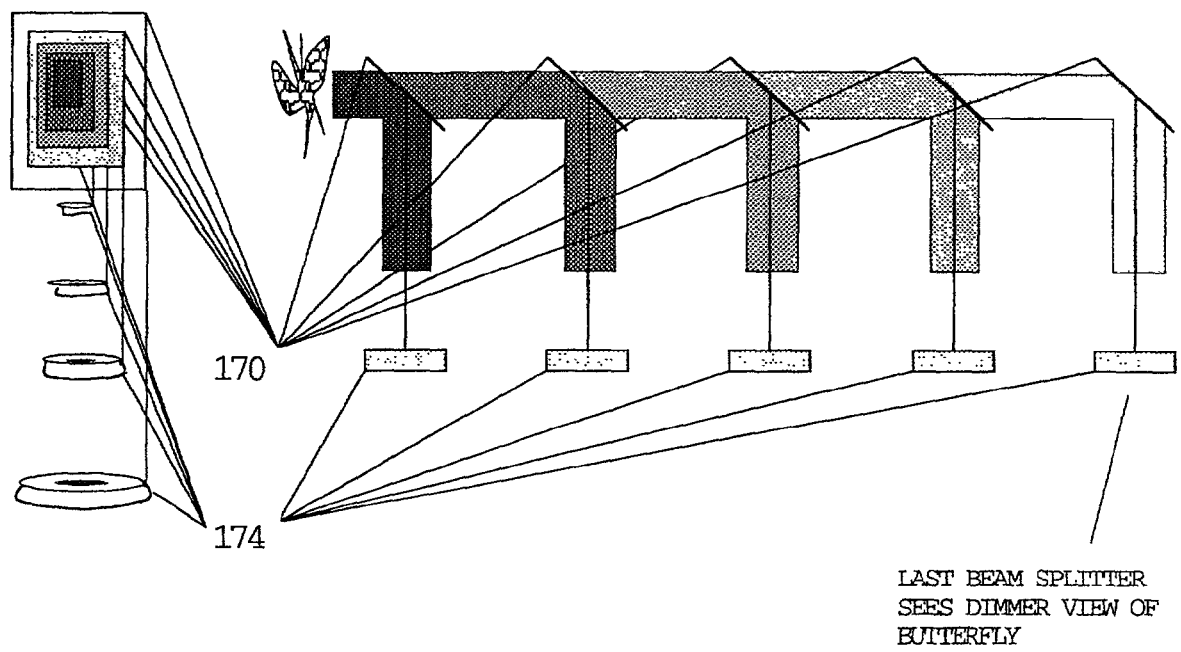

FIG. 4 shows an array of transparent, beam-splitter like camera devices. Cameras see through one another, obviating need for rise series E in FIG. 2. The image of the butterfly seen by the furthest camera in the linear array is dimmer than the image seen by the closest. 174 are cameras, and 170 are beam splitters.

FIG. 5 is an outline for a program which recognizes an image of a target, and records the changes necessary to bring this target image file into conformity with an ideal target image.

FIG. 6 is an outline for a program which recognizes an image of a target, and records the changes necessary to bring a camera array to bear so that it captures target images which are in conformity with an ideal target image.

FIG. 7 is an outline for a program which recognizes bright points of light projected onto a subject, identifies these points as seen by adjacent camera array members, and assigns these morph point locations to visual images of the subject captured by this same camera array.

FIG. 8 shows an alternative embodiment of two views of a curvilinear array of devices according to the present invention.

FIG. 9 shows an array of beam splitters as an alternative embodiment of the present invention and relating to the embodiment seen in FIG. 4.

Figure 10:
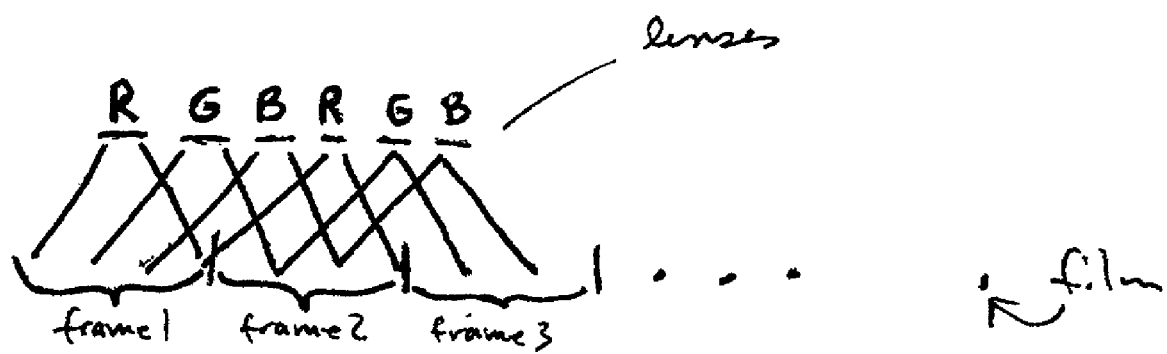

FIG. 10 shows an arrangement method to squeeze a greater amount of frames of visual data onto a length of color film.

Figure 11:
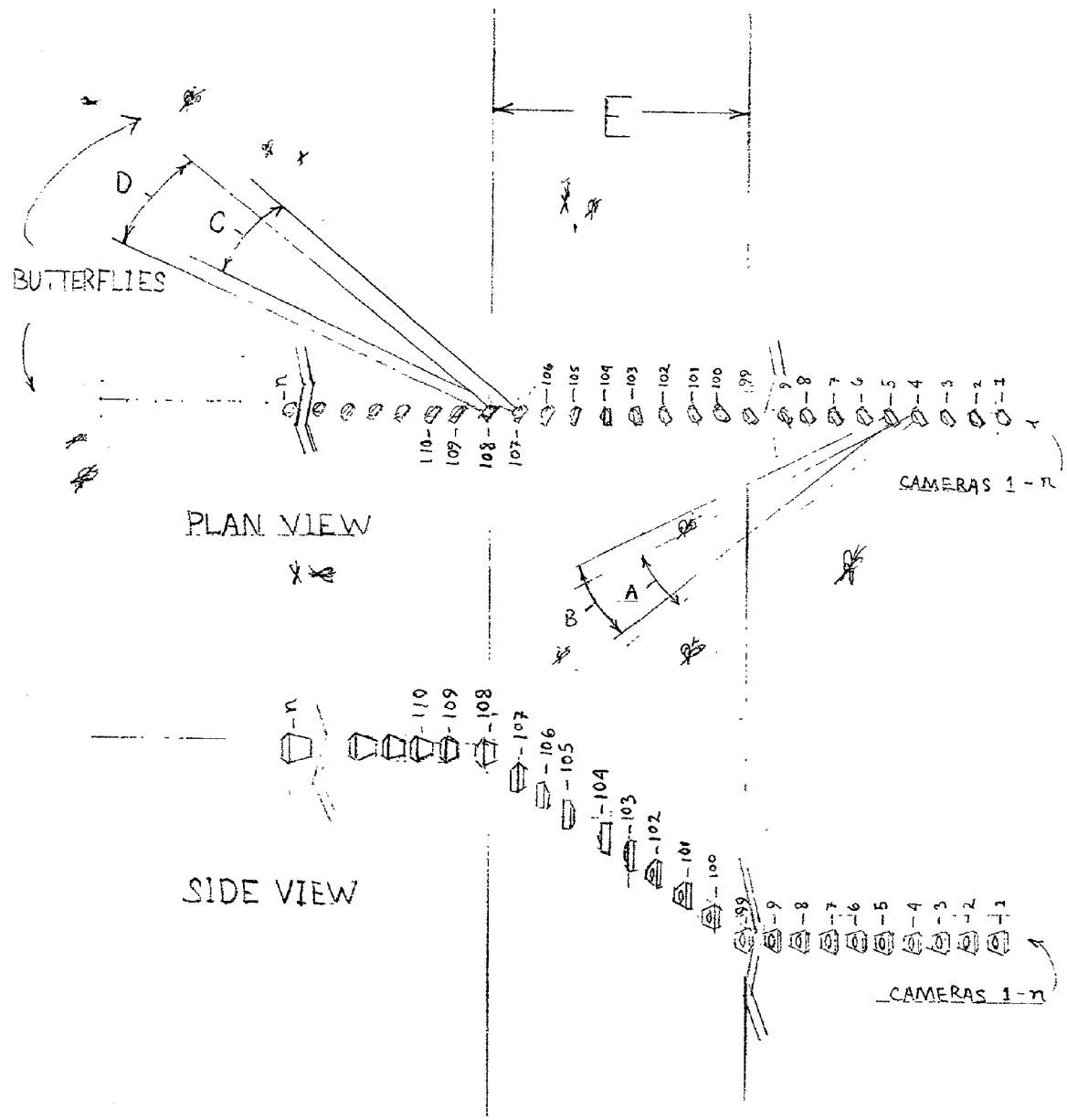

FIG. 11 shows two views of a curvilinear array of camera devices according to the present invention set up to record butterflies.

Figure 12:
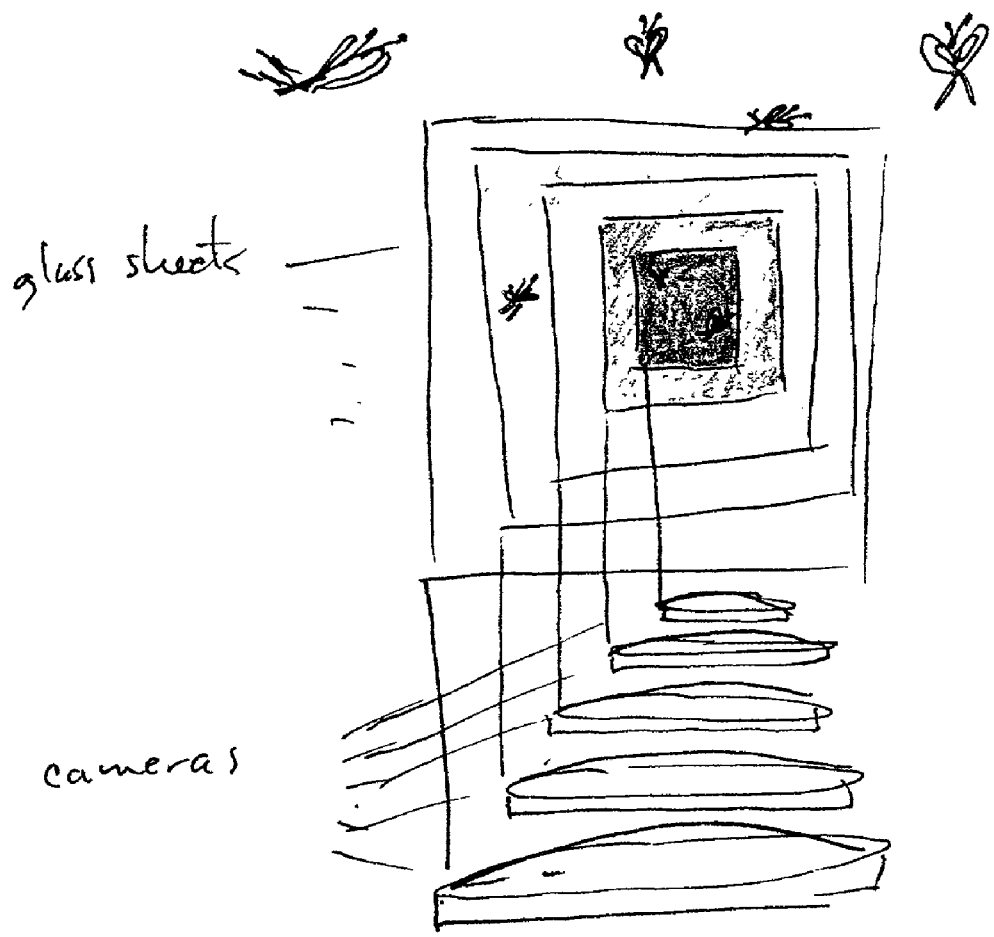

FIG. 12 illustrates the use of glass sheets in association with the camera array of the present invention.

Figure 13:
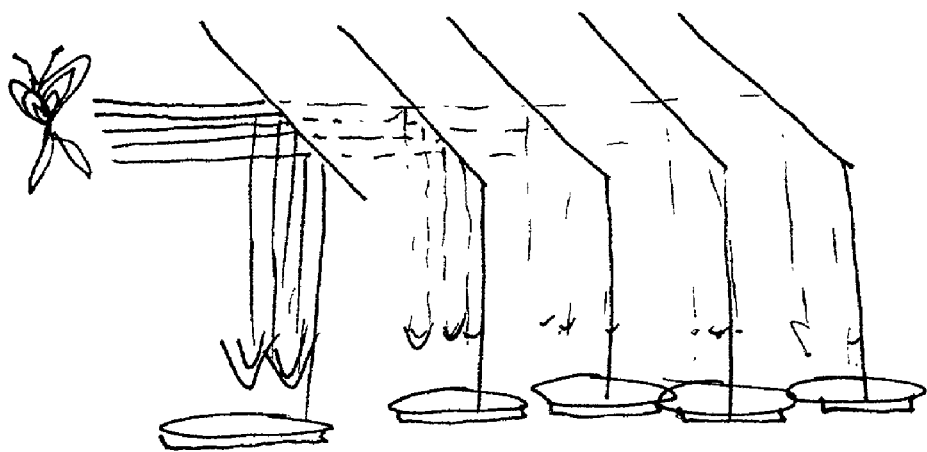

FIG. 13 is an alternative view of the beam splitter shown in FIG. 4.

DESCRIPTION AND OPERATION OF INVENTION

In order to illustrate our methods, several new motion picture effects are described below. Also described below are effects produced by arrays of other types of receiver, like microphones, or flow meters, which illustrate our methods to study energy flow.

Figure 1A:
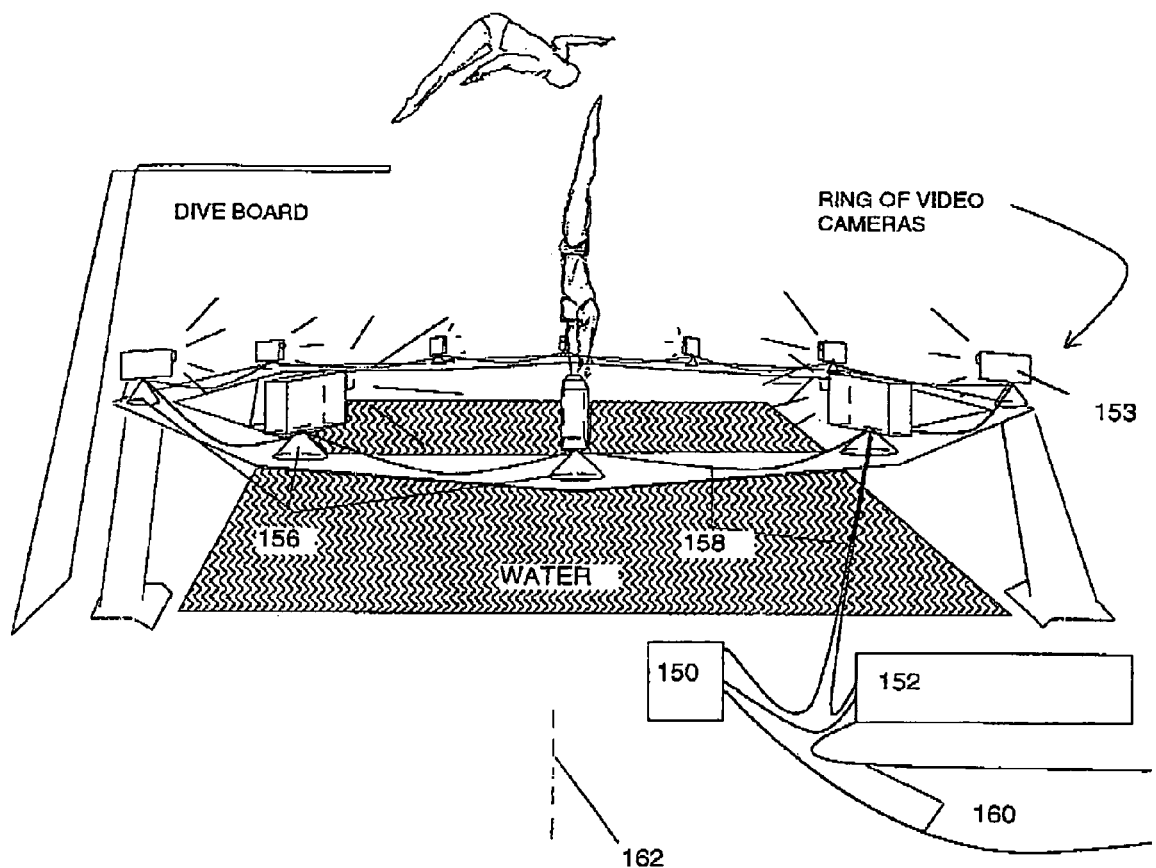
FIG. 1B shows frames of a diver, ready to be rotated.
FIG. 1C shows alternative frames of a diver, ready to be rotated.
Figure 1C:
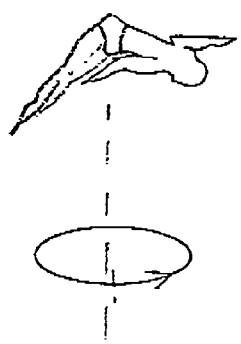
Figure 1B:
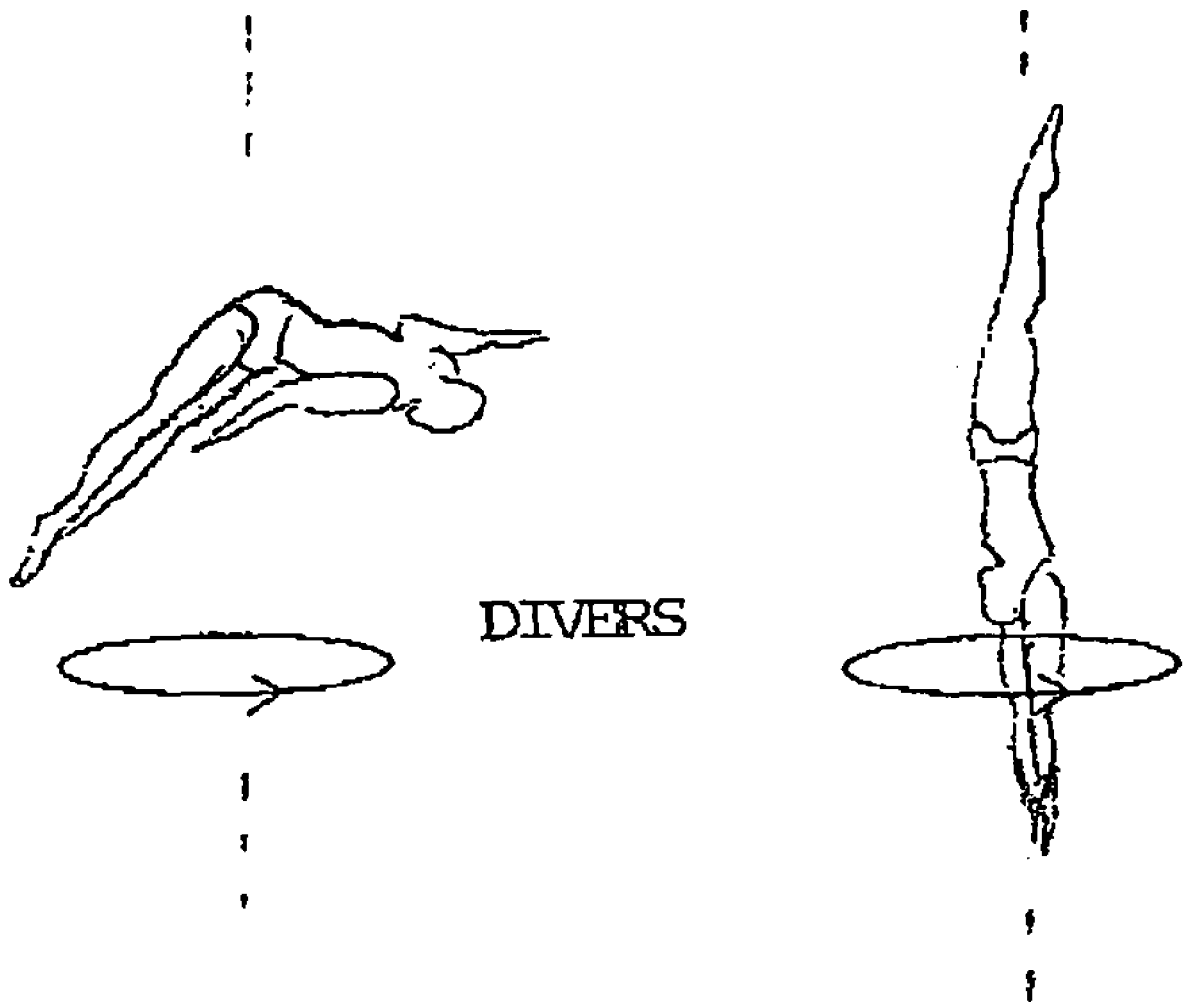

For one example, in order to analyze light energy reflecting from the surfaces of an Olympic diver, we arrange a plurality of motion video cameras into a horizontal ring around the diver, with all cameras aimed and focused upon the same point, and all adjusted to take in the entire dive area. In FIG. 1A, we see the diver surrounded by the camera ring. Here, 10 of a multitude of cameras are shown. In practice we would use from 8 cameras, to hundreds of cameras. In this example, the cameras are fixedly mounted at 15 degrees to the horizontal to avoid including other cameras in the scene. Cameras are gen-locked to synchronize image capture on either internal tape (such as "High Eight" 8 mm) or external multi-track video recorder. Infra-red focus maintains sharp focus of moving diver. Lighting and aperture are selected to provide good subject focus while giving little background detail. In this instance, we operate our cameras in synchrony, capturing frame after frame of visual data as he dives through the air and into the water. We choose a moment in time, say that moment when the diver just begins to slice the water. We choose the frame recorded most closely in time to that instant, say frame number 248, and have a video control computer select frame 248 from each camera by frame-grab control and plant each in sequence on an "output" tape. Displayed traditionally, at 30 video frames per second onto a video screen, this output tape produces a rotational effect; like looking at a rotating statue of this diver, frozen at this instant of time, with even the water droplets frozen in mid-air. This display would blend and enhance the more usual action tapes of the event. The effect appears on a traditional television screen, and the viewer can sit and watch while this amazing, beautiful and useful effect is displayed. The viewer does not have to get up out of a chair and walk about a display mechanism to enjoy this effect.

We could then continue our analysis in this example by choosing a sequence taken by one particular motion video camera in our array, and displaying this new sequence in reverse order from frame 248, backward to a moment when the diver was in mid-flight; perhaps frame 220. We might then freeze and rotate the diver in mid-dive, at frame 220, analyze the crucial moment, then rotate back to any camera position, and allow the action to continue forward, displaying frames 220, 221, 222, etc., from this camera angle. The diver would then be released from freeze, and would complete his entry into the water.

In my first experiments with array cameras, an array of forty-one still photographic cameras was deployed into a ninety-degree circular arc. Each camera was aimed roughly at a vertical target located at the vertex of this arc, and a frame of film in each camera was exposed in synchrony. The images of an assistant as she ran through this array, with cameras on bulb, and while she is constantly illuminated by tungsten light have been joined and displayed at 24 frames per second to form a stunning new visual effect. The tunnel of light which she created can be rotated upon the screen through the ninety degrees, revealing new and marvelous visions of human locomotion. At one end of the rotational arc, the tunnel of light is oriented from left to right across the screen. At the other end of the rotational arc, she is running directly out toward the viewer. All angles in between were recorded by the arc, and during display, these angles flash in sequence upon the screen to simulate walking around this statue of a frozen stream of time. It's stunning. Another display series formed during these early sessions reveals the inventor, standing at the vertex of the array, pouring water from a pitcher into a goblet. Each camera captured an image of this action in synchrony with the other array cameras. Exposure was made by a brief, ½,000 second burst of light from a studio strobe. This brief exposure froze the water droplets in mid-air as they sprayed out from the goblet. Upon display, the series taken from the array creates a simulation of a frozen statue, which can be rotated back and forth through ninety degrees on screen.

The array of cameras need not be an arc. We could, for instance, arrange a plurality of cameras in a dome shape, positioning individual cameras so that many different chains of cameras can be traced out for a variety of display series.

Or, we could form a curvilinear array and operate it to form a tracking effect. For example, we would arrange our cameras and employ our methods to simulate a walk through a room filled with frozen butterflies. Refer to FIGS. 2 and 8 to find still cameras curvilinearly arrayed down a path through this room, with array members pointing first left (cameras 20-103; cameras 1-*n*), then rising smoothly through series E while shifting gaze to the right (cameras 104-112), then continuing through the room pointed rightward (cameras 113-*n*). The angles of view of adjacent cameras (A,B) and (C,D) slightly overlap. This is a technique familiar to animators. If the subject image were to leap too far, frame to frame, the displayed result would form a strobe-like effect. Overlap from image to image provides a smooth, coherent result. The brightly lit room is full of live, fluttering butterflies. All shutters are made to release at one moment, at high shutter speed, (say 1/1,000 second) to capture a frame of visual data. We select that frame from each camera, and arrange them in sequence from camera 20 to camera n, or camera 1 to n in FIG. 8, on a storage medium such as, but not limited to motion picture film, video tape, optical or magnetic storage disc, or RAM memory. We then display this sequence rapidly as is done in motion picture or television display. (Twenty-four frames per second is the theatrical motion picture standard, and 30 frames per second is the NTSC standard, but any rate which is rapid enough to form a coherent visual effect may be employed.) This rapid display forms a visual simulation of travel through this room full of living butterflies. The simulation begins as we travel into the room, gazing slightly to the left, according to our array configuration (FIG. 2 cameras 20-103: FIG. 8, cameras 1-103). Near the middle of the room we rise as we shift gaze to the right (E, cameras 104-113), and proceed through the room, gazing slightly rightward (cameras 113-n.). Cameras rise out of the preceding cameras' view from 104 to 113.

If we display the frames from these cameras at 24 frames per second, the trip through the room would be n/24 seconds long. The rate of travel along a display sequence taken from a chain array of cameras could be controlled by varying the distance between adjacent cameras, by varying the rate of display, or by altering the display sequence from 1, 2, 3, 4, etc. to 1, 1, 2, 2, 3, 3, 4, 4, etc The rate of travel can also be altered by using interpolation methods to compute frames between those captured by array members and including these frames in our display sequence. (See interpolation discussion below.) Animators frequently "shoot on twos", that is, they display each frame twice, effectively doubling the duration of the sequence. We could shorten the duration, (speed up the travel rate) by skipping every other frame, as in 1, 3, 5, 7, etc. The animator must bear in mind that there are limits beyond which the human perceptual system cannot integrate displayed series into coherent movement. A good book on animation technique will help the practitioner of our methods to design arrays, manipulate, and display images so that the result conforms to the needs of the human perceptual system.

We need not capture or display only one image per frame, per camera. Multiple exposures, can be captured on one frame of film. This one frame of multiple images can be selected from each camera, combined in simple sequence from camera to camera and displayed to form a rotational effect of this multi-image frame. Or, we can super-impose several frames and project them in sequential "packs" projecting frames 1, 2 and 3 packed together as one frame, then 2, 3, 4; then 3, 4, 5; etc. to form powerful and novel effect.

When we speak of freezing a moment for analysis, we mean, of course that we record a 'short interval' of time for analysis. Even a millionth of a second is a stream of time. So, short moments can be frozen and analyzed, or longer moments can be 'frozen'. For example, it is interesting to allow a subject to move through the target zone of a horizontally elliptical still camera array while the cameras are on bulb, thus capturing a tunnel of moving light on each frame of film; which tunnel can be rotated, or otherwise displayed visually according to our methods.

We would employ a computer controlled timing device to control the timing and sequence of array member energy capture to produce novel effects. This would be a relatively simple computer program which would be capable of accepting instructions from a human operator and passing these instructions on to array members; which instructions detail the time at which each particular array member was to begin and end recording. Array members could be hard-wired to this control device (as in Matsunaga U.S. Pat. No. 3,682,064), or could be controlled by infrared or radio transmission. For instance, in a simple ring of 200 still cameras, one could time the array to capture first a frame from cameras 1 and 200 simultaneously, then 2 and 199 simultaneously, then 3 and 198, and so on, to 100 and 101, with a new pair of exposures being made at equally spaced time intervals so that the last pair, 100;101 is made ½ second after the first pair 1;200. If the cameras each capture a brief, "freezing" exposure of the subject, then selecting, arranging and displaying frames 1, 2, 3, 4, 5, 6, etc. would produce the effect of moving around the subject from camera position 1 to 200; and at the same time the subject would change its position. At camera position 100 in our displayed series, the subject would reverse itself and move back to its original position, while we continue to move around the subject from 101 to 200. Thus, simulating the effect one would get by properly combining for display the film footage taken by two super-humanly fleet footed motion picture camera operators who had raced along a circular track about the subject and had filmed the subject with super high frame rate motion picture cameras, one operator racing clockwise, the other counter-clockwise.

Other array timing patterns could be useful, for example, in the array above, expose 1, 3, 5, 7, 9, . . . 199 at one instant, then 2,4,6,8,10 . . . 200 the next. Displaying 1, 2, 3, 4, 5, simulates a rotational effect about the subject, while the subject moves back and forth from its position in the odd series to its position in the even series. This type of series display could help us to analyze vibrational characteristics of structures. It is but one example of how the timing of the array is variable to create new analytical tools.

There are difficulties to be overcome when employing my methods. Employing camera arrays, one must be certain that the images are in registration with each other so that upon display, images do not jitter about annoyingly, or even incoherently. This is a problem familiar to traditional animators.

To illustrate: Locate a statue of an athlete. Take a motion picture camera, and place it on a wheeled cart which runs on an elliptical track about the statue. Take frame after frame of film of the statue, while rolling around on the cart. On projection, one sees a statue of this athlete, rotating up on the screen. But, if the track has many imperfections, the cart will bounce up and down, pitching, rolling, and yawing drastically along. Each time the camera exposes a frame of film, the camera's orientation to the statue is displaced not only by a smooth elliptical increment about the track, but by some additional, unwanted factors. If the amount of unwanted displacement were too great, then upon projection, the image of the statue would jitter and jump about on the screen so much that the human mind-could not integrate image after image into a coherent rotational effect.

We may encounter this tracking problem with our camera array. If the cameras, one after another, pitch, roll and yaw, from camera to camera, by an undesirable amount in orientation to each other, or in orientation to the athlete, then, upon projection we will encounter the same jitter and jump problems mentioned above. Or, in our curvilinear tracking example above, if camera after camera were not arrayed with smoothly changing orientation to the visual subject, and to one another, the effect would not cohere into a simulated "walk through a frozen moment."

To avoid these problems, array members must be positioned with great accuracy. Focus, focal length, aim, position along the array, distance between cameras, orientation to subject, and orientation to adjacent array members must all be controlled so that a displayed series of images taken from a chain of array members forms a coherent effect. The following methods facilitate such accurate positioning of array members.

First, we choose a reference target, of which a 2D image reveals the targets 3D orientation to the array. Please refer to the rod-shaped targets in FIG. 3A. The target is placed so that a computer program (see FIG. 5) can recognize the target against its background. If the target appears sufficiently different from the background in hue or brightness a computer program can separate the image pixels of the target from the image pixels of the background. We place the reference target inside our elliptical array, and record an image of the target with each pre-oriented camera. Each camera's orientation to the target, and to one another can be deduced for registration purposes. Individual camera deviation from, say, a desired vertical orientation is revealed by a non-vertical rod image created by that camera. Sphere image size indicates distance from the target (or, focal length adjustment). An ideal sphere size indicates proper camera distance/focal length adjustment. An ideal size sphere coupled with a shorter than ideal rod image indicates an angular displacement of the camera, under or over the target. Different colored portions of the target indicate, in the image, which portion of the target is rotated toward or away from the camera. And so on. A computer program (See FIG. 6) would analyze these positional attributes and would determine the camera adjustments necessary to, for instance, achieve vertical rod position, and to center the sphere portion of the target on the display screen, or, to change the dimensions of the target image (mechanically zooming in or out, or dollying in or out) so that the sphere remains the same size from camera image to camera image. These array attributes are adjusted according to this image analysis to maintain properly registered image size, focus, and orientation during display of the visual effect. These array attributes can altered by hand for each array member, or by remote control means using electromechanical or mechanical rotational, panning, tilting, trucking, tracking, focusing, focal length adjusting devices attached to each array member. These remote functions could be controlled by computer program, which program would use the results of the above image analysis to establish and maintain proper image size and orientation in each camera. A series displayed from this properly configured array would show the target rod rotating smoothly about an axis drawn from target rod end to end (see FIG. 3B).

In practice, this degree of accuracy in array placement and operation will be difficult to maintain in a camera array which is being dynamically reconfigured to capture the action on an athletic field. Therefore, in addition to these array attribute manipulations, one could manipulate image records prior to recording them, or prior to displaying them, so that remaining registration problems are alleviated.

A computer automated process to perform these functions would facilitate instant replay effects of an athlete during competition. For example, prior to the diving events, our geometric target would be temporarily suspended in the dive space. Each camera in our apparatus would be pre-aimed at this target, and its view recorded. A computer program would analyze the recorded image of the target provided by each camera. If one of our cameras were aimed slightly and improperly tilted to the left, then the computer would see a target shape slightly tipped to the right. The program would measure this deviation, and would create a file record of the changes necessary to rotate this camera's output to vertical. We would not necessarily need to re-orient the camera itself; only the camera's output. A record is made for each camera, and these records are called a 'Record of Changes' or (ROC) file. When we later call for an instant replay of diving action, our program will quickly be able to manipulate the image from each camera according to (ROC) instructions, and feed the corrected images into the stream, forming our rotational effect.

In practice, the following series of steps would be performed to achieve a dynamically manipulable array, whose capture and display attributes would allow instant replay effects. First, a human operator or a computer program would direct camera array, shape, member position along the array, member orientation to the subject, member orientation to adjacent array members, member aim, and focus and focal length as accurately as possible, brining the array into proper adjustment to capture the data necessary to produce the desired display result. These adjustments would be effected using servo type mechanisms, and other mechanical or electro-mechanical devices attached to each camera member. The computer would then fine tune the array positional and optical attributes by target and ROC method. Finally, ROC file data would be used to change recorded image attributes (prior to image storage, or at replay); which changes would alleviate remaining registration problems upon display.

In my early photographic experiments mentioned before, my ROC target consisted of 2 small, spherical objects. The first sphere secured to the floor, the second suspended by a thread, directly above the first. Each of the 41 cameras was aimed roughly at this target area, and successive frames of film were exposed to capture a moment of action from all 41 camera locations, all at once. To assemble a projectable series of frames, I first recorded the image of the ROC target as seen by each camera. Later, an analysis of this image revealed each camera's orientation to the target. Each image was then manually altered according to ROC information to form a projectable rotational effect.

The target need not be a rigid, physical one. It could be a target of reflected light, projected into the area of activity, reflecting from the surfaces of the particulate matter suspended in the air. For instance, one would project several, narrow laser beams so that these beams cross one another to form three, different-colored, bright spots in space. These pin-points in space would be bright enough to be detected by the cameras in our array. Different colored lasers could be used. Or, one could pulse them at distinctive rates to make them differentiable.

If the light were invisible to human vision, either above or below the visible spectrum, or low enough in power, or of short enough duration to be humanly imperceptible, then these points of light could be projected during the athletic event. In an instant, we could re-aim to a new area of interest, project a target into that area, and use ROC target methods to fine tune array orientation and image output.

If the subject of interest moved to a new location, but was still in view of the array members; we could, without moving the array members, project a target to that new area, and calculate a new ROC. The computer would apply the new ROC to manipulate each cameras output to form a rotational effect about that new location.

Or, this same capability could be acquired by calculating a multitude of ROCs in advance, for a particular array orientation. The axis of rotation associated with each ROC target would be plotted upon a map of the athletic area. One could then, instantly choose a particular ROC from the map which corresponds to the area about which we now wish to rotate. For instance, multiple targets, physical or projected, might be placed, one at a time, or as a group, along the path which a diver is likely to travel. (See FIG. 3A.) These targets would be imaged by the array. If one wished to rotate about the diver just as the diver comes off the board, one would choose the ROC from the target which was at that location, and computer manipulate the images from our circular array to form a rotational effect about that axis. If we wish to capture him as he enters the water, we would choose the ROC target which resided at that location. And so on.

One might pre-establish several different camera array configurations which would produce acceptably registered display series. These configurations would be noted in computer memory taking note of all array attribute adjustments, and the positions of the mechanical or electromechanical devices which control these attributes. When the area of visual interest changed during an athletic event, the array would be dynamically adjustable to a multitude of pre-established configurations to enable effect capture for use in display. Mechanical means, such as detent-like devices, might be used in place of computer memory to establish array configuration. Several detent positions might be pre-established, into which the array attributes can be snapped to cover an event dynamically.

A dense, 3-D lattice-work of laser beams could be projected through space, from many different sources. This lattice could serve as a multitude of targets, and a ROC could be calculated for any axis of rotation covered by the lattice.

Without projecting our ROC targets remotely, we could still place target shapes into the athletic arena in such a way that they did not interfere with the athletes. (For example, humanly invisible light sources could be placed outside the area of activity, but still visible to our camera array. Perhaps off to the side, and/or above the area of activity. Even stationary equipment on the field might serve as ROC targets; e.g. goal posts, markings on the field, court, etc.

In curvilinear, or linear arrangements of cameras, one would choose a ROC target shape like a picket fence which each camera could see as it moved through the subject area. One would aim or manipulate images so that verticals stay vertical, and picket images are captured and/or displayed so that they move at the desired rate across the screen.

These methods need not be restricted to the capture and analysis of visible light. One might wish to analyze sound energy, or some humanly invisible form of electromagnetic energy. We might wish to measure fluid, flow, and employ some array of flow meters to do so.

If one wished to analyze sound from some source employing this method, our ROC target might then be 3 discreet sound sources in the target area, each emitting timed pulses of omnidirectional sound, and each emitter operating at a different frequency. A plurality of microphones might be arrayed about this target area, and one might analyze the sound gathered by this array, at a particular instant in time. One could then calculate the microphones' orientations to the target area by looking at the incoming wave form received by an array member and comparing it to an ideal, and comparing it to the wave forms being gathered by its array neighbors. One might then use these comparisons to adjust the aim of the array members in relation to the sound source, bringing array members to bear on the source, or causing them to diverge from the source according to our desired method of analysis. One might want to simulate the sound heard during a walk away from a source, or a turn away, or a flight up over, etc. One could use the ROC target method to adjust our array and/or its output to effect the desired result.

Or, one might wish to combine aural and visual information according to our methods. For example, if our subject were a bat (animal), one might choose to couple a microphone to each camera, forming a combined array. We might choose a short stream of visual information from each member of the array ($\frac{1}{1000}$ second shutter speed) to freeze, and pair each of these "frames" with $\frac{1}{1000}$ second stream or "frame" of aural information, then display this series according to our method. Thus, simulating a rotating statue of a bat, frozen and screeching, at that one instant.

We could employ camera devices which are sensitive to an extended electromagnetic range and could slowly, during display, begin to replace the humanly visual spectrum data with data collected above or below visual range. As we begin to exceed the upper boundary of the visual range, we could signal this fact visually by adding dots, or bands, to the display; perhaps changing the size of the markings to correspond to higher and higher wavelength. Or, we could begin to replace the first invisible ultraviolet, with the lowest visible red from the spectrum, reusing the visual portion of the spectrum to represent this next highest sector. The first time we reused the visual portion, we could superimpose tiny markings upon the display, then as we ascend farther, we could use larger markings, and so on. We could employ a similar procedure as we descend below the human visual spectrum. We would replace the first invisible infrared with the highest visible violet. Or, we might display only one visual frequency at a time as our subject rotates, then proceed up or down the spectrum, one frequency at a time.

We could do the same sort of thing with sound, reusing the aural spectrum up and down the range of possible pressure wave frequencies. We might create a visual representation of the sound. Perhaps, the louder the sound or the higher the pitch, the more we would tint the picture red. We could then "see" a representation of the sound as well as hear it.

We might similarly create a visual, and aural representation of fluid flow, by using flow meters in place of microphones in the above array. On display, we could substitute aural data to represent flow data. Higher flow could be represented as a higher pitch, so that as we visually "walk around" the flow source, or flow subject, we could watch it and listen to it. As our visual perspective changed from camera to camera, our aural perception of flow would change as well. We could hear the flow. Or, higher flow could be represented as higher visual light frequency, as is done in some computer modeling of air flow. In our method, we would present data, captured from the real world, and then represented according to our methods visually and/or aurally.

In all of these instances of the collection and analysis of energy, we could resort to computer interpolation techniques to fill the gaps between energy gathering device members of the array. It seems to me, however, that it will usually be desirable to fill these gaps with actual energy gathering devices, if at all practical, rather than to try to infer the energy traveling through that space. Nature has a way of surprising us.

To illustrate such a surprise, consider that we might have an array of 2 cameras, aimed and focused at a point 3 meters away. Our subject is a narrow tube. This tube is oriented so that if one places his eye directly between our cameras, and looks at the tube, he can see down its length to a glittering diamond. But, the tube is long, and narrow, and the diamond is far in and cannot be seen by either camera 1 or camera 2. We do not currently know how to interpolate an image of this diamond by using information from cameras 1 and 2. This 2-camera array is imperfect. The human visual system does something analogously imperfect, taking images from an array of 2 eyes, and forming what seems to be a complete view of the subject. It may be, however, that we are not seeing all of the visual information emanating from this front view.

Imagine, for example, an extremely narrow laser beam which could be placed directly in front of us, so that it shone directly upon the spot, midway between our eyes. If the beam source were extremely small, and it traveled through a vacuum so as not to be reflected or refracted by matter, this beam could be placed at some distance from us, hitting us right between the eyes, and we would not see it. Neither eye member could provide sufficient information for our brain to compute the existence of this beam. If we moved our array so that this beam entered the optical system of an eye, suddenly, as if from nowhere, a blazing point of light would appear as the laser's beam blasted away at the retina. There is almost certainly visual data from the real world that behaves this way. Even when array members are placed as closely together as are human eyes, visual information slips past. We may some day be able to substitute for an array, a continuous light sensitive surface which would record holo-graphically a complete record of the interference pattern created as reference and subject beam strike this surface. We might, then, have a perfect array.

In practice, there will be times when interpolation is desired. We may not be able, for financial or technical reasons, to create a perfect array for our needs; but we may be able to use interpolative methods to approximate the function of a perfect array. For example, we might wish to set up an elliptical array of cameras about our subject. We'd like to be able to analyze all visual data passing through this ellipse, but we can only physically accommodate a certain number of taking devices in our array. So, we would use interpolation methods to guess at the appearance of our subject as it might appear from angles between our array members.

The process of image interpolation called morphing is well known, and we would proceed according to it's established principles in order to interpolate from image to image, but we would suggest a method which automatically assigns morph points to our subject.

Traditionally, an animator who wishes to morph from one image to the next, must manually assign sets of morph points which the morphing program uses to gradually transform image 1 into image 2. In our example, we wish to compute a series of images such as would be seen from angular positions between 2 adjacent cameras in our array. We want to be able to display this series upon a screen so that it appears that we have rotated our subject, slowly from the view seen by camera 1 to the view seen by camera 2. If our subject were a vertically oriented human face, and our circular camera array looks down on this face from 45 degrees above an imaginary horizontal plane running through the middle of the face, then upon elliptical rotation, the tip of the nose must move from image 1, elliptically across our screen, and wind up in proper location at the tip of the nose in image 2. All other details of the face must move and match up with their counterparts in image 2. Furthermore, all of these points must move according to their location in real space. The tip of the nose will move along a larger ellipse, and more rapidly across the screen, than will the bridge of the nose. At the same time, the visual data must be smoothly transformed, incrementally with our computed series, so that hue, and brightness values change from those in image 1 to those in image 2.

One could manually assign morph points to several bodily features, but the time required to assign such a large number of pairs would preclude instant replay. An automatic method would enable instant replay, and would assign such a dense covering of morph points, perhaps even to every pixel of every camera image in the array, that morphing would be accomplished with maximum accuracy.

One method to automatically assign morph points would be to pepper the surfaces of the subject with thousands, or even millions of different colored pinpoints of reflected light. As many colors as are humanly differentiable could be used to indicate to a human morph point selector which points in successive camera images are to be paired as morph points. Or, a computer could be programmed to recognize these different color point locations (see FIG. 7). Since 24-bit color processors can recognize over 16 million colors, we could project a dense array of 16 million different colored points onto our subjects surfaces. The computer would then be instructed to analyze 2 or more images between which we wished to interpolate. Points of light of the same color appearing in the 2 or more images would be assigned as corresponding morph points. This morph point data would be captured simultaneously or intermittently with visual data of the subject. And the morph point data captured by each camera would be applied to the visual data captured by that same camera.

Simultaneous capture could occur if the light frequencies employed in the dot array were above or below those used in the visual data. Visual data would be used to form our effect, point data would be used to establish morph points.

Intermittent collection could occur if we pulsed the points of light, so that at one instant, the subject were illuminated by the multitude of colored points, and the next instant the subject were illuminated by full-spectrum white light. We would collect morph point information intermittently with visual data. The location of each morph point would then be matched to a location on the visual image data. For example, a motion video camera could be designed to read out frames of data at two times the normal rate. One frame would be read as the subject was illuminated by colored points, then a frame of visual information would be read as the subject was illuminated by white light. If the subject did not move too far in the interval between morph point collection and visual data collection, one could rely on sufficiently accurate correspondence between the image locations of morph point data and visual data. If the subject were moving rapidly, the rate of intermittent morph point projection and white light projection, and synchronous frame collection would be increased, or, at least, the interval between a frame of morph point data collection and a frame of visual data collection would be decreased so as to assure adequate correspondence between subject position in morph data image and visual data image.

Sixteen million colors may not be necessary. Colors could be reused in the array, provided that same color dots appeared sufficiently far apart on the subject surface. The computer would then look at images, and find corresponding colors in confined image sectors. For instance, a deep blue dot in the top ¼ sector of the image area would not be matched with a deep blue dot in the lower ¼ sector of the image area.

Light reflecting from one point on the subject surface might take on color information in reflecting from that surface. The light reflecting from that point toward camera 1 might be color altered differently from the light reflecting from that point toward camera 2. We might overcome this problem by designing our array of points so that each point in the array is surrounded by points of greatly different wavelength. The computer would be instructed to look for close matches in wavelength from a particular image area. For example, in a horizontal circular array of 20 cameras around a dancer. A blue dot shining off the tip of her left elbow might appear ½ of the way up from the bottom of the image. In the camera 2 image, this dot will also appear approximately ½ of the way from the bottom. The computer would then be instructed to look for blue dots, near to this color, on this approximate band of horizontal image data from the camera array. Finding a close match, the program will assume that the dot is the same color, and will assign morph points accordingly to the visual data which corresponds spatially to this morph point.

In another method to automatically assign morph points to a subject, we would first measure the precise geometric dimensions of our subject, and form a mathematical model of the subjects 3D surface locations. We would then match the model to visual data collected by our array, thus forming morph points automatically.

Methods of remote measurement have been described as in Ross, U.S. Pat. No. 4,199,253; Apr. 22, 1980. Please refer to this patent specification. Such a method could be used to remotely measure a subject. We would employ a plurality of such measuring systems. The angles from which these Ross systems projected and collected radiant energy data would be chosen so that the subject's surfaces of interest were all well covered with diagnostic imagery. The more complex the shape of the subject, the more angles might be required. For instance, a dancer might move during our analysis so that her arm blocked the diagnostic light from a Ross system transmitter from reaching her torso. In order to avoid such shadows, one would have to ensure that diagnostic radiant energy were projected from a plurality of angles, around, and perhaps above and under the subject.

Three dimensional measurements taken from a multitude of angles around the subject would be combined by computer program to form a mathematical model of the subject according to triangulation methods well known in the computer modeling area.

We would measure in advance, the orientation of the measuring devices to the camera array, and could then match 3D data to the 2D visual data collected by the camera array, thus automatically forming morph points on the surfaces of each display image between which we wished to morph. We would measure Ross system orientation to camera array by ROC target method, first using the Ross systems to measure the dimensions of a ROC target such as seen in FIG. 3A of my specification. We would then measure the difference in size and orientation of the target as seen by the Ross systems and the camera array members. A visual representation of this process would include displaying the 3D computer model of the ROC target in 2D projection on a video screen. A record would be made of changes in the 3D model necessary to bring its 2D projection into conforming size, shape, and orientation with the ROC target images of each camera array member.

We would now know what the subject looks like from each camera position, and we would know the three spatial dimensions of the subjects surfaces, and we would know how these dimensions appear as seen from each camera position. We could then pair these data sets to form a multitude of morph points for each camera image. Each pixel, of each image would be accurately assigned to its proper location in 3D space. In effect, each pixel of each image would become a morph point.

The interpolation of images between camera locations would then proceed according to known morphing technique. To form a rotational effect, each pixel, from each camera image, would be instructed to move across the screen in an elliptical manner about an axis of rotation. Points on the subject close to the axis of rotation would move on smaller ellipses, traveling shorter distances per unit time than would points on the subject farther from the axis. Pixels, representing light reflected from these points, and assigned 3D coordinates, would move across the screen according to simple geometric rules. And, as they moved, these pixels would slowly take on the hue and brightness values of their corresponding morph points as seen from camera x+1.

One could form a different effect by interpolating from camera image to camera image captured by a linear array of cameras, such as was described earlier in the "walk through the butterflies" example. The automatic light point mentioned above would assign morph points to the images from adjacent cameras. Pixels of an image from camera 1 would move under common morph program control in linear fashion across the screen to their corresponding morph point in image 2. Each morph point pixel of image 1 linearly taking on the positional, hue and brightness characteristics of its corresponding morph point pixel in image 2. And so on through the room of frozen butterflies.

Another method to deduce the 3-D shape of our subject would be to analyze the silhouette of the subject as it appears from different camera locations. With several silhouettes compounded, a model of a simple subject would be formed mathematically. Known Blue Screen type processes would be employed to select the subject from its background. More complex shapes would require a remote measurement method which probes each subject surface more accurately and thoroughly, such as the Ross type measurement system above, or perhaps a sophisticated radar or sonar measurement method. Methods of remote measurement have been described which project a grid of lines onto the surface of an object. The distorted reflections of the grid lines are analyzed by computer program to determine the object's dimensions. Or, a raster, or rasters, of beams, or pulsed beams could be scanned across the subject area, from several different angles, perhaps using different colored lasers. A computer program would then analyze the reflected shapes traced out as these beams encounter a subject, and from these measurements deduce the subject's geometry. The multiple rasters could scan, perhaps in multiple passes, over the entire surface of our subject, leaving no surface unmeasured. An optically projected, un-scanned grid might contain unilluminated surprises between grid lines.

Rather than interpolating to create more angular records of a subject a new method occurs to me as I type on May 13, 1994, of using transparent cameras (See FIG. 4.) to form an array which would fill in the gaps in our traditional camera arrays. These cameras can see through one another, and we densely surround our subject with an array of beam splitter camera devices, each of which would reflectively transfer only some of the light from the subject to a camera which corresponds to that particular beam splitter. Gaps in an initial array of such cameras would be filled by a second array of such cameras, behind the first. The members of this second array would be slightly offset from the members of the first, so that the second array captured angles of view between the angles captured by the first array. And so on, with further arrays. If using identical cameras in both arrays, with all cameras in both arrays set to the same optical characteristics; then images captured farther away from the subject will be slightly different in size, and slightly different in perspective than images captured closely. The images dimensions from the various array ranks can later be conformed for insertion into projectable series. If the distances from the subject to the various array ranks are very nearly equal and/or the focal length of the cameras in each array is long, then image size and optical perspective will change very little rank to rank.)

I add, for clarification, that the ROC target method of image manipulation would also be used in a silver halide camera array method. The ROC target images gathered by these cameras in array would be scanned into computer memory, where a computer program would analyze the target size and shape to determine array member orientation. Positional and optical attributes of array members would be accordingly altered, manually or by remote control means, and/or subsequent images recorded by this camera array orientation would be altered, manually or by computer program, according to ROC target information, and printed in properly registered series onto film or another display medium.

I add, for clarification, that in several embodiments, I envision array members, mounted on moving platforms or suspended gondolas, so that they can be moved about by remote control in a horizontal plane, rotated horizontally, raised and lowered in a vertical plane, and rotated vertically. In other embodiments, array members will be more fixedly mounted, confined, say to an elliptical track about a subject, or more fixedly mounted so that the only degrees of movement would be horizontal and vertical rotation as in FIG. 1A, or locked down semi-permanently, or permanently, to take in only one field of view.

It has been suggested that arcurate and circular arrays of camera devices be arranged horizontally about a subject of interest, with optical axes of said camera devices convergent upon a scene, which cameras each record a different horizontally displaced image of the subject, which displacement is employed to present sequences of stero-optical image pairs to the viewer, which pairs are presented by complex means, such as specially built motion picture projectors, specially built and complex screens or other specially built and complex reflective or transmissive display devices, using specially built and complex obturating devices to separate and display left images to viewers' left eyes, and right images to viewers' right eyes. These effects seem to be limited to the display of traditional motion picture effects, in 3D illusion, or the traditional display of still 3D images.

I claim:

1. A method for producing a visual special effect incorporating a controllable amount of light tunneling, comprising the steps of:
    providing an array of cameras deployed along a curvilinear path with each camera focused on a common scene containing a moving object;
    controlling time sequential actuation of a series of adjacent or proximate cameras along said array of cameras so that each camera begins to capture an image of the scene at a different point in space from each other;
    controlling a time length of exposure of each adjacent or proximate camera to allow a controlled amount of light tunneling caused by said moving object to accumulate to provide respective light tunnel images;
    capturing a tunnel of moving light on a pair of cameras of the array of cameras, from the moving object to form a frozen image of the moving object; and
    displaying a sequence of said respective light tunnel images of the frozen image in a motion picture medium to create the visual special effect from a point of view of moving along said curvilinear path while viewing said common scene, wherein the sequence of said respective light tunnel images is rotated between first and second angles on the motion picture medium to change the view of the frozen image.

2. The method according to claim 1 further comprising capturing a second sequence of a plurality of light tunnels of moving light of the moving object over a first time segment using one of the cameras in the array of cameras.

3. The method according to claim 2 further comprising displaying a second sequence of the plurality of light tunnel images associated with the second sequence of a plurality of light tunnels of moving light of the moving object over the first time segment.

4. The method according to claim 3 further comprising capturing a third sequence of a plurality of light tunnels of moving light of the moving object over a second time segment using a second one of the cameras of the array of cameras.

5. The method according to claim 4 further comprising displaying a third sequence of the plurality of light tunnel images associated with the third sequence of a plurality of light tunnels of moving light of the moving object over the second time segment.

6. The method according to claim 2 wherein displaying the sequence of said respective light tunnel images comprises combining a plurality of light tunnel images from a plurality of cameras onto a single combined display image.

7. The method according to claim 1 wherein displaying the sequence of said respective light tunnel images is displaying at least a portion of the plurality of light tunnel images at a motion picture frame rate.

8. The method according to claim 1 wherein displaying the sequence of said respective light tunnel images is displaying a perspective view of the common scene, while the moving object appears to be frozen in the common scene.

9. The method according to claim 1 wherein controlling the time sequential actuation of a series of adjacent or proximate cameras captures an image of the common scene at different points in time.

* * * * *